US012541539B2

(12) United States Patent
Cougias

(10) Patent No.: US 12,541,539 B2
(45) Date of Patent: *Feb. 3, 2026

(54) METHODS AND SYSTEMS FOR A COMPLIANCE FRAMEWORK DATABASE SCHEMA

(71) Applicant: Unified Compliance Framework (Network Frontiers), Las Vegas, NV (US)

(72) Inventor: Dorian J. Cougias, Oakland, CA (US)

(73) Assignee: Unified Compliance Framework (Network Frontiers), Las Vegas, NV (US)

( * ) Notice: Subject to any disclaimer, the term of this patent is extended or adjusted under 35 U.S.C. 154(b) by 22 days.

This patent is subject to a terminal disclaimer.

(21) Appl. No.: 18/678,908

(22) Filed: May 30, 2024

(65) Prior Publication Data

US 2024/0320245 A1    Sep. 26, 2024

Related U.S. Application Data

(60) Continuation of application No. 17/160,175, filed on Jan. 27, 2021, now Pat. No. 12,026,183, which is a
(Continued)

(51) Int. Cl.
*G06F 16/31* (2019.01)
*G06F 16/21* (2019.01)
(Continued)

(52) U.S. Cl.
CPC .......... *G06F 16/316* (2019.01); *G06F 16/211* (2019.01); *G06F 16/2282* (2019.01); *G06F 16/27* (2019.01); *G06F 40/197* (2020.01)

(58) Field of Classification Search
CPC .. G06F 16/316; G06F 16/211; G06F 16/2282; G06F 16/27; G06F 40/197
(Continued)

(56) References Cited

U.S. PATENT DOCUMENTS

| 4,847,766 A | 7/1989 | McRae et al. |
| 5,715,468 A | 2/1998 | Budzinski |

(Continued)

FOREIGN PATENT DOCUMENTS

| EP | 1975837 A1 | 10/2008 |
| EP | 3404891 A1 | 11/2018 |
| WO | WO 2008121382 A1 | 10/2008 |

OTHER PUBLICATIONS

Madkour et al., "A Survey of Shortest-path Algorithms," arXiv preprint arXiv:1705.02044v1, pp. 1-26, May 2017.
(Continued)

*Primary Examiner* — Sheree N Brown
(74) *Attorney, Agent, or Firm* — Seed Intellectual Property Law Group LLP

(57) ABSTRACT

Generating a compliance framework. The compliance framework facilitates an organization's compliance with multiple authority documents by providing efficient methodologies and refinements to existing technologies, such as providing hierarchical fidelity to the original authority document; separating auditable citations from their context (e.g., prepositions and or informational citations); asset focused citations; SNED and Live values, among others.

24 Claims, 26 Drawing Sheets

Related U.S. Application Data division of application No. 16/432,634, filed on Jun. 5, 2019, now abandoned, which is a continuation of application No. 15/794,405, filed on Oct. 26, 2017, now Pat. No. 10,353,933, which is a division of application No. 14/685,466, filed on Apr. 13, 2015, now Pat. No. 9,996,608, which is a continuation of application No. 13/723,018, filed on Dec. 20, 2012, now Pat. No. 9,009,197.

(60) Provisional application No. 61/722,759, filed on Nov. 5, 2012.

(51) Int. Cl.
  *G06F 16/22* (2019.01)
  *G06F 16/27* (2019.01)
  *G06F 40/197* (2020.01)

(58) Field of Classification Search
  USPC .......................................................... 707/741
  See application file for complete search history.

(56) References Cited

U.S. PATENT DOCUMENTS

| | | | |
|---|---|---|---|
| 5,745,776 A | 4/1998 | Sheppard, II | |
| 5,765,172 A * | 6/1998 | Fox | G06F 11/1608 |
| 5,819,265 A | 10/1998 | Ravin et al. | |
| 5,832,480 A | 11/1998 | Byrd, Jr. et al. | |
| 5,974,574 A * | 10/1999 | Lennie | G06F 11/1451 |
| | | | 714/E11.123 |
| 6,289,342 B1 | 9/2001 | Lawrence et al. | |
| 6,393,389 B1 | 5/2002 | Chanod et al. | |
| 6,453,315 B1 | 9/2002 | Weissman et al. | |
| 6,529,917 B1 * | 3/2003 | Zoltan | G06F 16/9017 |
| | | | 707/E17.037 |
| 6,581,074 B1 * | 6/2003 | Wong | G06F 16/27 |
| 6,675,169 B1 | 1/2004 | Bennett et al. | |
| 6,738,780 B2 | 5/2004 | Lawrence et al. | |
| 6,823,325 B1 | 11/2004 | Davies et al. | |
| 6,966,030 B2 | 11/2005 | Ashford et al. | |
| 6,996,583 B2 * | 2/2006 | Wilmot | G06F 16/27 |
| 7,333,927 B2 | 2/2008 | Lee et al. | |
| 7,493,253 B1 | 2/2009 | Ceusters et al. | |
| 7,725,399 B2 | 5/2010 | Nakahara et al. | |
| 7,822,597 B2 | 10/2010 | Brun et al. | |
| 7,869,989 B1 | 1/2011 | Harvey et al. | |
| 8,019,590 B1 | 9/2011 | Kinder | |
| 8,019,769 B2 | 9/2011 | Rolle | |
| 8,108,207 B1 | 1/2012 | Harvey et al. | |
| 8,190,423 B2 | 5/2012 | Rehberg et al. | |
| 8,219,566 B2 | 7/2012 | Rolle | |
| 8,417,693 B2 | 4/2013 | Lempel et al. | |
| 8,489,630 B2 * | 7/2013 | McBeath | G06F 16/3325 |
| | | | 707/769 |
| 8,612,466 B2 | 12/2013 | Kikuchi et al. | |
| 8,661,059 B1 | 2/2014 | Cougias | |
| 9,009,197 B2 | 4/2015 | Cougias | |
| 9,020,808 B2 | 4/2015 | Branton | |
| 9,110,975 B1 | 8/2015 | Diligenti et al. | |
| 9,122,741 B1 * | 9/2015 | McAlister | G06F 16/13 |
| 9,123,024 B2 | 9/2015 | LeVine et al. | |
| 9,256,718 B2 | 2/2016 | Silin | |
| 9,449,353 B2 | 9/2016 | Bercow et al. | |
| 9,575,954 B2 | 2/2017 | Cougias et al. | |
| 9,715,497 B1 | 7/2017 | Bhadbhade et al. | |
| 9,760,586 B1 | 9/2017 | Cook | |
| 9,798,753 B1 | 10/2017 | Cook | |
| 9,798,767 B1 | 10/2017 | Cook | |
| 9,846,694 B1 | 12/2017 | Cook | |
| 9,923,931 B1 | 3/2018 | Wagster | |
| 9,967,285 B1 | 5/2018 | Rossman et al. | |
| 9,977,775 B2 | 5/2018 | Cougias et al. | |
| 9,996,608 B2 | 6/2018 | Cougias | |
| 10,198,491 B1 | 2/2019 | Semturs et al. | |
| 10,353,933 B2 | 7/2019 | Cougias | |
| 10,387,575 B1 | 8/2019 | Shen et al. | |
| 10,430,317 B2 | 10/2019 | Richter et al. | |
| 10,606,945 B2 | 3/2020 | Cougias et al. | |
| 10,769,379 B1 | 9/2020 | Cougias et al. | |
| 10,824,817 B1 | 11/2020 | Cougias et al. | |
| 10,896,211 B2 | 1/2021 | Cougias | |
| 11,120,227 B1 | 9/2021 | Cougias et al. | |
| 11,216,495 B2 | 1/2022 | Cougias | |
| 11,514,521 B1 | 11/2022 | Arumilli et al. | |
| 11,516,016 B2 | 11/2022 | Oswalt | |
| 2002/0065675 A1 | 5/2002 | Grainger et al. | |
| 2002/0082717 A1 | 6/2002 | Hellberg et al. | |
| 2002/0169771 A1 | 11/2002 | Melmon et al. | |
| 2002/0184068 A1 | 12/2002 | Krishnan et al. | |
| 2003/0067498 A1 | 4/2003 | Parisi | |
| 2004/0006466 A1 | 1/2004 | Zhou et al. | |
| 2004/0030540 A1 | 2/2004 | Ovil et al. | |
| 2004/0059932 A1 | 3/2004 | Takeuchi et al. | |
| 2004/0107124 A1 | 6/2004 | Sharpe et al. | |
| 2005/0080776 A1 | 4/2005 | Colledge et al. | |
| 2005/0080780 A1 | 4/2005 | Colledge et al. | |
| 2005/0096914 A1 | 5/2005 | Williamson et al. | |
| 2005/0138046 A1 * | 6/2005 | Miettinen | G06F 21/64 |
| 2005/0138056 A1 | 6/2005 | Stefik et al. | |
| 2005/0193009 A1 | 9/2005 | Reinhardt et al. | |
| 2005/0203924 A1 | 9/2005 | Rosenberg | |
| 2005/0228799 A1 | 10/2005 | Farlow et al. | |
| 2006/0047656 A1 | 3/2006 | Dehlinger et al. | |
| 2006/0149720 A1 | 7/2006 | Dehlinger | |
| 2006/0149800 A1 | 7/2006 | Egnor et al. | |
| 2006/0259475 A1 | 11/2006 | Dehlinger | |
| 2007/0011211 A1 | 1/2007 | Reeves et al. | |
| 2007/0016583 A1 | 1/2007 | Lempel et al. | |
| 2007/0088683 A1 | 4/2007 | Feroglia et al. | |
| 2007/0118515 A1 | 5/2007 | Dehlinger | |
| 2007/0192085 A1 | 8/2007 | Roulland et al. | |
| 2007/0282592 A1 | 12/2007 | Huang et al. | |
| 2007/0283252 A1 | 12/2007 | Stuhec | |
| 2008/0091408 A1 | 4/2008 | Roulland et al. | |
| 2008/0208563 A1 | 8/2008 | Sumita | |
| 2008/0262863 A1 | 10/2008 | Stickley et al. | |
| 2008/0287142 A1 | 11/2008 | Keighran | |
| 2009/0024385 A1 | 1/2009 | Hirsch | |
| 2009/0089126 A1 | 4/2009 | Odubiyi | |
| 2009/0089195 A1 | 4/2009 | Salomon et al. | |
| 2009/0112859 A1 | 4/2009 | Dehlinger | |
| 2009/0119141 A1 | 5/2009 | McCalmont et al. | |
| 2009/0187567 A1 | 7/2009 | Rolle | |
| 2009/0265199 A1 | 10/2009 | Moerdler et al. | |
| 2010/0114628 A1 | 5/2010 | Adler et al. | |
| 2010/0145678 A1 | 6/2010 | Csomai et al. | |
| 2010/0250313 A1 | 9/2010 | Crocker et al. | |
| 2011/0112973 A1 | 5/2011 | Sanghvi | |
| 2011/0179075 A1 | 7/2011 | Kikuchi et al. | |
| 2011/0208769 A1 | 8/2011 | Kemp | |
| 2011/0225129 A1 * | 9/2011 | Agrawal | G06F 16/1748 |
| | | | 707/769 |
| 2011/0225155 A1 | 9/2011 | Roulland et al. | |
| 2011/0270603 A1 | 11/2011 | Ovil et al. | |
| 2012/0036157 A1 | 2/2012 | Rolle | |
| 2012/0066135 A1 | 3/2012 | Garst et al. | |
| 2012/0072422 A1 | 3/2012 | Rollins et al. | |
| 2012/0078801 A1 | 3/2012 | Holland et al. | |
| 2012/0116984 A1 | 5/2012 | Hoang et al. | |
| 2012/0197631 A1 | 8/2012 | Ramani et al. | |
| 2012/0323937 A1 * | 12/2012 | Modi | G06F 16/2386 |
| | | | 707/754 |
| 2013/0047221 A1 | 2/2013 | Warnock et al. | |
| 2013/0091486 A1 | 4/2013 | Gemmell et al. | |
| 2013/0226662 A1 | 8/2013 | LeVine et al. | |
| 2013/0297477 A1 | 11/2013 | Overman et al. | |
| 2013/0346302 A1 | 12/2013 | Purves et al. | |
| 2014/0032209 A1 | 1/2014 | Etzioni et al. | |
| 2014/0046892 A1 | 2/2014 | Gopalakrishnan et al. | |
| 2014/0052617 A1 | 2/2014 | Chawla et al. | |
| 2014/0244524 A1 | 8/2014 | Brestoff et al. | |
| 2014/0310249 A1 | 10/2014 | Kowalski | |

(56) References Cited

U.S. PATENT DOCUMENTS

| | | |
|---|---|---|
| 2015/0012402 A1 | 1/2015 | Buck |
| 2015/0066478 A1 | 3/2015 | Onishi et al. |
| 2015/0142682 A1 | 5/2015 | Ghaisas et al. |
| 2015/0220621 A1 | 8/2015 | Cougias |
| 2015/0249651 A1 | 9/2015 | Okamoto et al. |
| 2016/0306789 A1 | 10/2016 | Cougias et al. |
| 2016/0350283 A1 | 12/2016 | Carus et al. |
| 2016/0371618 A1 | 12/2016 | Leidner et al. |
| 2017/0075877 A1 | 3/2017 | Lepeltier |
| 2017/0147635 A1 | 5/2017 | McAteer et al. |
| 2017/0178028 A1 | 6/2017 | Cardonha et al. |
| 2017/0220536 A1 | 8/2017 | Chiba et al. |
| 2017/0236129 A1 | 8/2017 | Kholkar et al. |
| 2017/0300472 A1 | 10/2017 | Parikh et al. |
| 2018/0053128 A1 | 2/2018 | Costas |
| 2018/0101779 A1 | 4/2018 | Canim et al. |
| 2018/0314754 A1 | 11/2018 | Cougias |
| 2018/0357097 A1 | 12/2018 | Poort et al. |
| 2018/0373691 A1 | 12/2018 | Alba et al. |
| 2019/0080018 A1 | 3/2019 | Pilkington et al. |
| 2019/0080334 A1 | 3/2019 | Copeland et al. |
| 2019/0163778 A1 | 5/2019 | Brown et al. |
| 2019/0188400 A1 | 6/2019 | Vandervort |
| 2019/0260694 A1 | 8/2019 | Londhe et al. |
| 2019/0286642 A1 | 9/2019 | Cougias |
| 2019/0286643 A1 | 9/2019 | Cougias |
| 2020/0050620 A1 | 2/2020 | Clark et al. |
| 2020/0111023 A1 | 4/2020 | Pondicherry Murugappan et al. |
| 2020/0176098 A1 | 6/2020 | Lucas et al. |
| 2020/0327285 A1 | 10/2020 | Cox et al. |
| 2020/0380075 A1 | 12/2020 | Boada et al. |
| 2021/0004535 A1 | 1/2021 | Cougias et al. |
| 2021/0149932 A1 | 5/2021 | Cougias |
| 2021/0365638 A1 | 11/2021 | Cougias et al. |
| 2022/0067290 A1 | 3/2022 | Cougias et al. |
| 2022/0159093 A1 | 5/2022 | Joshi et al. |
| 2022/0309416 A1 | 9/2022 | Barday |
| 2023/0031040 A1 | 2/2023 | Cougias et al. |
| 2023/0075614 A1 | 3/2023 | Cougias et al. |

OTHER PUBLICATIONS

"AuditScripts—About Us," <www.auditscripts.com/about-us/>, 2011. (2 Pages).

"CSA Cloud Security Alliance—History," <cloudsecurityalliance.org/history/>, 2010, (2 Pages).

"HITRUST Common Security Framework Matures with Enhancements for 2010," Feb. 1, 2010, 4 pages. < hitrustalliance.net/hitrust-common-security-framework-matures- enhancements-2010/>.

"ISF Information Security Forum," <securityforum.org/about/>, first published 2007, (3 Pages).

Badarudeen et al., "Assessing Readability of Patient Education Materials: Current Role in Orthopaedics," *Clinical Orthopaedics and Related Research* 468(10):2572-2580, May 22, 2010. (9 pages).

Baldwin et al., "Chapter 1—Multiword Expressions," *Handbook of Natural Language Processing*, Second Edition:1-40, 2010.

Cloud Security Alliance, "Security Guidance for Critical Areas of Focus in Cloud Computing V2.1 ," Dec. 2009, 76 pages.

Devlin et al., "BERT: Pre-training of Deep Bidirectional Transformers for Language Understanding," Cornell University, 2018, 14 pages.

Ferrari et al., "Detecting requirements defects with NLP patterns: an industrial experience in the railway domain," *Empirical Software Engineering* 23:3684-3733, 2018.

Final Office Action for U.S. Appl. No. 16/432,634, mailed Oct. 12, 2021, 10 pages.

Final Office Action for U.S. Appl. No. 16/432,634, mailed Oct. 12, 2021, 17 pages.

Final Office Action for U.S. Appl. No. 16/432,737, Date Mailed Feb. 11, 2021, 10 pages.

Final Office Action for U.S. Appl. No. 16/459,385, mailed Apr. 23, 2021, 17 pages.

Final Office Action for U.S. Appl. No. 17/160,175, mailed May 11, 2023, 18 pages.

Final Office Action for U.S. Appl. No. 17/389,959, mailed May 18, 2022, 18 pages.

Final Office Action for U.S. Appl. No. 17/389,959, mailed May 2, 2023, 31 pages.

Gharbieh et al., "Deep Learning Models For Multiword Expression Identification," *Proceedings of the 6th Joint Conference on Lexical and Computational Semantics*, Canada, Aug. 3-4, 2017, pp. 54-64.

International Preliminary Report on Patentability for International Application No. PCT/US2016/026787, dated Oct. 24, 2017 (10 pages).

International Search Report and Written Opinion for International Application No. PCT/US2013/068341, dated Feb. 26, 2014, 9 pages.

International Search Report and Written Opinion for International Application No. PCT/US2016/026787, mailed Jul. 22, 2016, 13 pages.

International Search Report and Written Opinion for International Application No. PCT/US2021/048088, mailed Feb. 9, 2022, 13 pages.

International Search Report, mailed Nov. 8, 2022, for International Patent Application No. PCT/US2022/037624. (3 pages).

Karat et al., "Designing Natural Language and Structured Entry Methods for Privacy Policy Authoring," Human-Computer Interaction—Interact IFIP TC13 International Conference, Rome, Italy, Sep. 12-16, 2005, pp. 671-684. (14 pages).

Karat et al., "Designing Natural Language and Structured Entry Methods for Privacy Policy Authoring," Human-Computer Interaction—Interact IFIP TC13 International Conference, Rome, Italy, Sep. 12-16, 2005, pp. 671-684. (15 pages).

Lan et al., "ALBERT: a Lite Bert for Self-Supervised Learning of Language Representations," arXiv preprint arXiv:1909.11942, 2019, 17 pages.

Masini, F., "Multi-Word Expressions and Morphology," Oxford Research Encyclopedias, 2019, 30 pages.

Mikolov et al., "Distributed Representations of Words and Phrases and their Compositionality," Advances in neural information processing systems:3111-3119, 2013.

Neumann et al., "An Analysis of Public REST Web Service APIs," 97/1/2021, IEEE Transactions on Services Computing, vol. 14, No. 4, Jul./Aug. 2021, pp. 957-970 (Year: 2021).

Non Final Office Action for U.S. Appl. No. 13/952,212, Date Mailed Oct. 15, 2013, 7 pages.

Non Final Office Action for U.S. Appl. No. 16/432,634, Date Mailed Feb. 5, 2021, 7 pages.

Non Final Office Action for U.S. Appl. No. 16/932,609, mailed May 3, 2022, 16 pages.

Non Final Office Action for U.S. Appl. No. 17/160,175, Date Mailed Dec. 6, 2022, 33 pages.

Non-Final Office Action for U.S. Appl. No. 17/389,959, mailed Dec. 7, 2021, 33 pages.

Non-Final Office Action for U.S. Appl. No. 17/460,054, Date Mailed Nov. 15, 2021, 5 pages.

Notice of Allowance for U.S. Appl. No. 17/460,054, dated Mar. 7, 2022, 12 pages.

Office Action for U.S. Appl. No. 16/459,385, Date Mailed Apr. 23, 2021, 17 pages.

Pennington et al., "GloVe: Global Vectors for Word Representation," Proceedings of the 2014 Conference on Empirical Methods in Natural Language Processing (EMNLP): 1532-1543, 2014.

Peters et al., "Deep contextualized word representations," arXiv preprint arXiv:1802.05365v2, 2018, 15 pages.

Proffitt, Tim, "Meeting Compliance Efforts with the Mother of All Control Lists (MOACL)," Sans Institute Information, Security Reading Room, 2010, 56 pages.

Radford et al., "Improving Language Understanding by Generative Pre-Training," 2018 (Retrieved from s3-us-west-2.amazonaws.com on Sep. 14, 2021.).

Ramshaw et al., "Text Chunking Using Transformation-Based Learning," Natural language processing using very large corpora, Springer, 1999, 157-176.

(56) References Cited

OTHER PUBLICATIONS

Ratinov et al., "Design Challenges and Misconceptions in Named Entity Recognition," Proceedings of the Thirteenth Conference on Computational Natural Language Learning (CoNLL):147-155, 2009.
Rohanian at al., "Bridging the Gap: Attending to Discontinuity in Identification of Multiword Expressions," Cornell University, 2019, 7 pages.
Schneider et al., "SemEval-2016 Task 10: Detecting Minimal Semantic Units and their Meanings (DiMSUM)," Proceedings of SemEval:546-559, 2016.
Škvorc et al., "MICE: Mining Idioms with Contextual Embeddings," Aug. 14, 2020, pp. 1-23.
Suissas, "Verb Sense Classification," Thesis to obtain the Master of Science Degree in Information Systems and Computer Engineering: 1-72, Oct. 2014.
U.S. Appl. No. 13/952,212, filed Jul. 26, 2013, Dorian J. Cougias. NOTE—Cite Granted U.S. Pat. No. 8,661,059—Already added to US citation list.
Vaswani et al., "Attention Is All You Need," 31st Conference on Neural Information Processing Systems, 2017, 11 pages.
Wahl, "The Distributional Learning of Multi-Word Expressions: A Computational Approach," Dissertation: 1-190, Jun. 2015.
Wikipedia, "Frequency (statistics)", 4 pages, downloaded Mar. 11, 2020. (Year: 2020).
Wikipedia, "Word lists by frequency", 10 pages, downloaded Mar. 11, 2020. (Year: 2020).

* cited by examiner

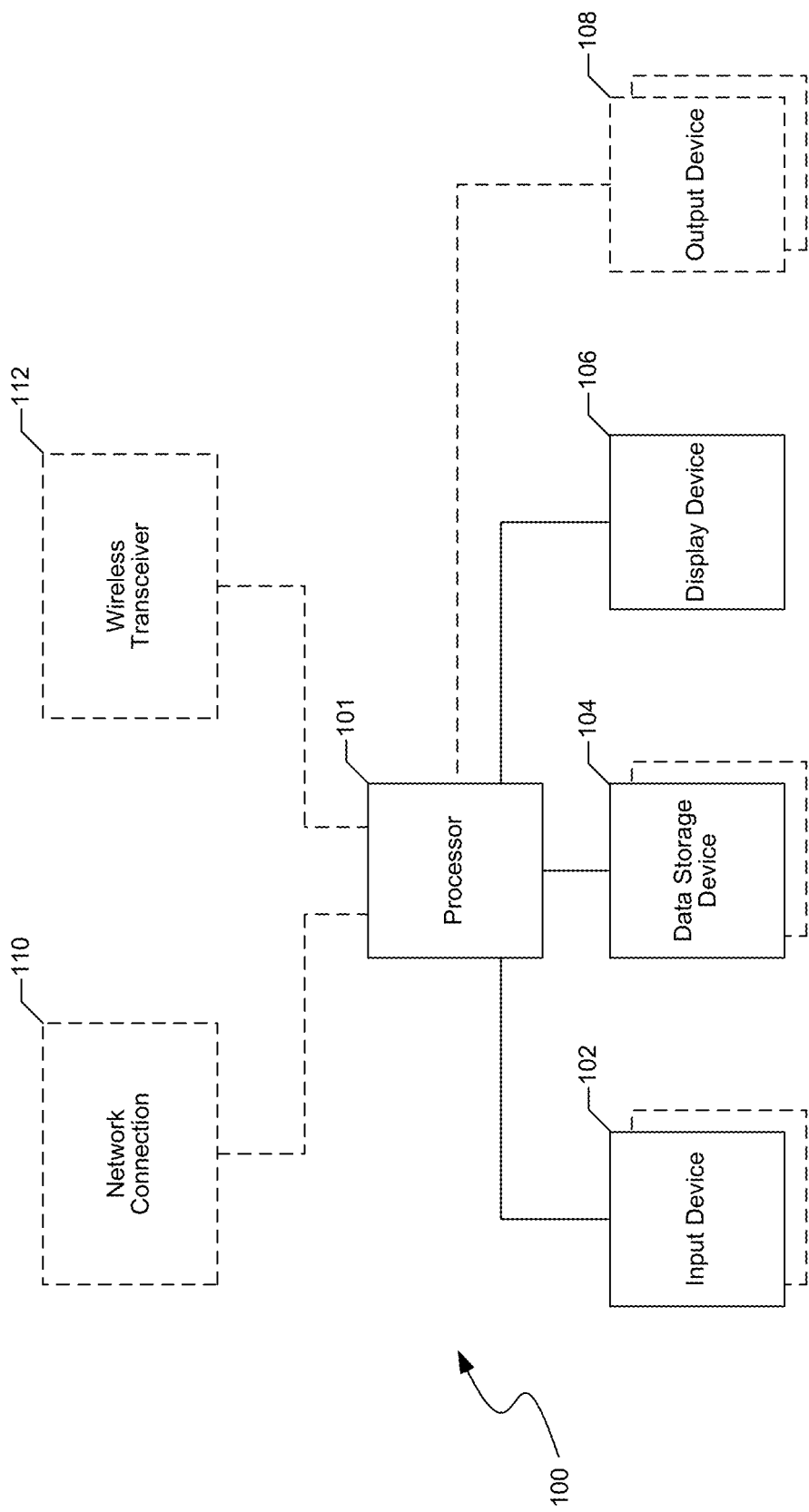

UCF Meta Data — 200

| Release Version | Citation ID | ID Check Digit | Live Status | SNED | Date Added | Date Modified | Deprecated By | Deprecation Notes | Parent ID | Sort Value | Language | License Info |
|---|---|---|---|---|---|---|---|---|---|---|---|---|
| Q3 12 - Final | 39307 | 4 | 1 | N | 2012-08-22 | 2012-08-22 | | | 0 | 2 | eng | URL |
| Q3 12 - Final | 39311 | 6 | 0 | D | 2012-08-22 | 2012-08-22 | 1234 | Description | 39307 | 1 | eng | URL |
| Q3 12 - Final | 32431 | 1 | 1 | E | 2011-02-04 | 2012-08-22 | | | 39311 | 2 | eng | URL |
| Q3 12 - Final | 32434 | 8 | 1 | E | 2011-02-04 | 2012-08-22 | | | 32433 | 1 | eng | URL |
| Q3 12 - Final | 32435 | 3 | 1 | E | 2011-02-04 | 2012-08-22 | | | 32433 | 2 | eng | URL |
| Q3 12 - Final | 32436 | 9 | 1 | E | 2011-02-04 | 2012-08-22 | | | 32430 | 1 | eng | URL |
| Q3 12 - Final | 32437 | 6 | 1 | E | 2011-02-04 | 2012-08-22 | | | 32430 | 2 | eng | URL |
| Q3 12 - Final | 32480 | 8 | 1 | E | 2011-02-04 | 2012-08-22 | | | 32479 | 1 | eng | URL |
| Q3 12 - Final | 32484 | 9 | 1 | E | 2011-02-04 | 2012-08-22 | | | 32482 | 1 | eng | URL |
| Q3 12 - Final | 32485 | 4 | 1 | E | 2011-02-04 | 2012-08-22 | | | 32483 | 2 | eng | URL |
| Q3 12 - Final | 32486 | 5 | 1 | E | 2011-02-04 | 2012-08-22 | | | 32483 | 1 | eng | URL |
| Q3 12 - Final | 32487 | 7 | 1 | S | 2011-02-04 | 2012-08-22 | | | 39308 | 1 | eng | URL |

*FIG. 2*

UCF Meta Data

| Release Version | AD ID | ID Check Digit | Live Status | SNED | Date Added | Date Modified | Deprecated By | Deprecation Notes | Genealogy | Sort ID | Language | License Info |
|---|---|---|---|---|---|---|---|---|---|---|---|---|
| Q2 12 - Final | 42 | 7 | 0 | D | 2009-03-16 | 2010-03-17 | 523 | This AD has been deprecated by | 0000000 0000565 0000637 | 000 006 001 001 | eng | URL |
| Q2 12 - Final | 499 | 3 | 0 | D | 2009-03-16 | 2010-03-17 | 523 | This is now included in PCI-DSS version 1.2. | 0000000 0000565 0000637 0000042 | 000 006 001 001 001 | eng | URL |
| Q2 12 - Final | 523 | 6 | 0 | D | 2009-03-16 | 2011-09-19 | 1071 | Due to updated version. | 0000000 0000565 0000637 | 000 006 001 002 | eng | URL |
| Q2 12 - Final | 1071 | 8 | 1 | S | 2011-02-04 | 2011-09-19 | | | 0000000 0000565 0000637 | 000 006 001 003 | eng | URL |

FIG. 4B

| AD Parent Category 403 | AD Originator 404 | AD Type 405 | AD Title Type 406 | AD URL 407 | UCF Basic Info 412 ||||| AD Availability 413 | AD Effective Date 414 | AD Description 415 |
|---|---|---|---|---|---|---|---|---|---|---|---|---|
| | | | | | AD Common Name 408 | AD Published Name 409 | AD Version 410 | Official Name 411 | | | | |
| Payment Card Guidance | Payment Card Industry | Contractual Obligation | AD | URL | PCI DSS 1.1 | (PCI) Data Security Standard | Version 1.1 | Office name of PCI DSS 1.1 | Free | 2009-07-01 | Description |
| Payment Card Guidance | Payment Card Industry | Contractual Obligation | AD | URL | PCI DSS Audit 1.1 | (PCI) Data Security Standard | Version 1.1 | Office name of PCI DSS Audit 1.1 | Free | 2009-07-01 | Description |
| Payment Card Guidance | Payment Card Industry | Self-Regulatory Body Requirement | AD | URL | PCI DSS | (PCI) Data Security Standard | Version 1.2.1 | Office name of PCI DSS | Free | 2008-10-01 | Description |
| Payment Card Guidance | PCI Security Standards Council | Self-Regulatory Body Requirement | AD | URL | PCI DSS | (PCI) Data Security Standard | 2 | Office name of PCI DSS | Free | 2010-10-01 | Description |

400b
400

UCF Meta Data

| Release Version | Citation ID | ID Check Digit | Live Status | SNED | Date Added | Date Modified | Parent ID | Sort Value | Language | License Info |
|---|---|---|---|---|---|---|---|---|---|---|
| Q3 12 - Final | 39307 | 4 | 1 | N | 2012-08-22 | 2012-08-22 | 0 | 2 | eng | URL |
| Q3 12 - Final | 39311 | 6 | 1 | N | 2012-08-22 | 2012-08-22 | 39307 | 1 | eng | URL |
| Q3 12 - Final | 32431 | 1 | 1 | E | 2011-02-04 | 2012-08-22 | 39311 | 2 | eng | URL |
| Q3 12 - Final | 32434 | 8 | 1 | E | 2011-02-04 | 2012-08-22 | 32433 | 1 | eng | URL |
| Q3 12 - Final | 32435 | 3 | 1 | E | 2011-02-04 | 2012-08-22 | 32433 | 2 | eng | URL |
| Q3 12 - Final | 32436 | 9 | 1 | E | 2011-02-04 | 2012-08-22 | 32430 | 1 | eng | URL |
| Q3 12 - Final | 32437 | 6 | 1 | E | 2011-02-04 | 2012-08-22 | 32430 | 2 | eng | URL |
| Q3 12 - Final | 32480 | 8 | 1 | E | 2011-02-04 | 2012-08-22 | 32479 | 1 | eng | URL |

*FIG. 5A*

UCF Basic Info

| Citation (503) | Citation Guidance (504) |
|---|---|
| § 1 | Install and maintain a firewall configuration to protect data and review those rules regularly. |
| § 1.1 | Establish firewall and router configuration standards that include the following: |
| § 1.1.1 Testing Procedures | Verify that there is a formal process for testing and approval of all network connections and firewall configurations. |
| § 1.1.2.a Testing Procedures | Verify that a current network diagram (for example, one that shows cardholder data flows over the network) documents all connections to cardholder data, including any wireless networks. |
| § 1.1.2.b Testing Procedures | Check the network diagram date to ensure the organization keeps it current. |
| § 1.1.3.a Testing Procedures | Verify that firewall configuration standards include requirements for a firewall at each Internet connection and between any DMZ and the internal network zone. |
| § 1.1.3.b Testing Procedures | Verify that the current network diagram is consistent with the firewall configuration standards. |
| § 1.1.4 Testing Procedures | Verify that firewall and router configuration standards include a description of groups, roles, and responsibilities for logical network management. |

*FIG. 5B*

UCF References 500c

| AD ID | CE ID | Audit Item ID | Asset ID | cDoc ID | Config Item ID | Mon Event ID | RecCat ID | RecEx ID |
|---|---|---|---|---|---|---|---|---|
| 1071 | 544 | | | | | | | |
| 1071 | 0 | | | 106 | | | | |
| 1071 | 548 | 3443 | 669;1524 | 30 | | | 211 | 21 |
| 1071 | 531 | 3446 | | | | | 211 | 18 |
| 1071 | 531 | 3447 | | | | | | |
| 1071 | 1274 | 3569 | 1524 | 106 | 353 | | 211 | 18 |
| 1071 | 531 | 3448 | | | | | 211 | |
| 1071 | 6410 | 3452 | | 105 | | | | 18 |

*FIG. 5C*

UCF Meta Data

| RecEx Release Version | RecEx ID | RecEx ID CheckDigit | RecEx Live Status | RecEx SNED | RecEx Date Added | RecEx Date Modified | RecEx Language | RecEx License Info |
|---|---|---|---|---|---|---|---|---|
| Q3 12 - Final | 18 | 8 | 1 | S | 2010-03-17 | 2011-09-19 | eng | URL |
| Q3 12 - Final | 21 | 2 | 1 | S | 2010-03-17 | 2011-09-19 | eng | URL |
| Q3 12 - Final | 22 | 0 | 1 | S | 2010-03-17 | 2011-09-19 | eng | URL |
| Q3 12 - Final | 24 | 9 | 1 | S | 2010-03-17 | 2011-09-19 | eng | URL |
| Q3 12 - Final | 25 | 4 | 1 | S | 2010-03-17 | 2011-09-19 | eng | URL |
| Q3 12 - Final | 26 | 5 | 1 | S | 2010-03-17 | 2011-09-19 | eng | |

*FIG. 6A*

UCF Meta Data

| Asset Release Version | Asset ID | Asset ID Check Digit | Asset Live Status | Asset SNED | Asset Date Added | Asset Date Modified | Asset Deprecated By | Asset Deprecation Notes | Asset Genealogy | Asset Sort ID | Asset Language | Asset License Info |
|---|---|---|---|---|---|---|---|---|---|---|---|---|
| Q3 12 - Final | 0 | 1 | 1 | S | 2010-03-17 | 2010-09-14 | | | 0 | 0 | eng | URL |
| Q3 12 - Final | 8 | 6 | 1 | S | 2010-03-17 | 2011-02-04 | | | 0 | 000 006 | eng | URL |
| Q3 12 - Final | 1525 | 3 | 1 | S | 2010-03-17 | 2011-02-04 | | | 0000000 0000008 | 000 006 003 | eng | URL |
| Q3 12 - Final | 1527 | 6 | 1 | S | 2010-03-17 | 2011-02-04 | | | 0000000 0000008 0001525 | 000 006 003 002 | eng | URL |
| Q3 12 - Final | 1526 | 9 | 1 | S | 2010-03-17 | 2011-02-04 | | | 0000000 0000008 | 000 006 004 | eng | URL |
| Q3 12 - Final | 1524 | 8 | 1 | S | 2010-03-17 | 2011-02-04 | | | 0000000 0000008 0001526 | 000 006 004 001 | eng | URL |

*FIG. 7A*

UCF Basic Info

| Asset Category (703) | Asset Class (704) | Asset Type (705) | Asset Name (706) | Asset Common Name (707) | Asset Version (708) | Asset Edition (709) | Asset Platform (710) | Asset Update (711) |
|---|---|---|---|---|---|---|---|---|
| All Assets | | | All Assets | | | | | |
| Network | | | Network | | | | | |
| Network | Network segments | | Network segments | | | | | |
| Network | Network segments | DMZ | DMZ | | | | | |
| Network | Network Access and Control Points | | Network Access and Control Points | | | | | |
| Network | Network Access and Control Points | Firewalls | Firewalls | | | | | |

*FIG. 7B*

UCF Meta Data

| Release Version | Config Item ID | Item ID Check Digit | Item Live Status | UCF Config Item SNED | Item Date Added | Item Date Modified | Item Deprecated By | Deprecation Notes | Item Language | Item License Info |
|---|---|---|---|---|---|---|---|---|---|---|
| Q3 12 - Final | 353 | 7 | 1 | S | 2010-03-17 | 2010-09-14 | | | eng | URL |
| Q3 12 - Final | 489 | 1 | 1 | S | 2010-03-17 | 2010-09-14 | | | eng | URL |
| Q3 12 - Final | 530 | 1 | 1 | S | 2010-03-17 | 2010-09-14 | | | eng | URL |
| Q3 12 - Final | 728 | 0 | 1 | S | 2010-06-14 | 2010-09-14 | | | eng | URL |
| Q3 12 - Final | 3437 | 9 | 1 | S | 2010-09-14 | 2010-09-14 | | | eng | URL |

UCF Basic Info

| UCF Config Item | UCF Config Item Setting |
|---|---|
| Network configuration settings | placing the device at a choke point between the Internet and a DMZ |
| Location of Asset | set to limit inbound and outbound traffic only to necessary addresses and protocols |
| Rules Configuration settings | deny all traffic unless explicitly allowed |
| Firewall setting: Inbound connections | enabled or disabled as appropriate |
| Access Control List (ACL) | defines explicit connections for any system containing protected data |

*FIG. 8*

| | | |
|---|---|---|
| | 1010a | |
| AD Release Version | Q2 12 - Final | |
| AD ID | 1071   (1050) | |
| AD ID CheckDigit | 8 | |
| AD Live Status | 1 | |
| AD SNED | S | |
| AD Date Added | 2011-02-04 | |
| AD Date Modified | 2011-09-19 | |
| AD Deprecated By | | |
| AD Deprecation Notes | | |
| AD Genealogy | 0000000 0000565 0000637 | |
| AD Sort ID | 000 006 001 003 | |
| AD Language | eng | |
| AD License Info | URL | |
| AD Parent Category | Payment Card Guidance | |
| AD Originator | PCI Security Standards Council | |
| AD Type | Self-Regulatory Body Requirement | |
| AD Title Type | AD | |
| AD URL | URL | |
| AD Common Name | PCI DSS | |
| AD Published Name | (PCI) Data Security Standard | |
| AD Version | 2 | |
| Official Name | Office name of PCI DSS | |
| AD Availability | Free | |
| AD Effective Date | 2010-10-01 | |
| Issuer ID | 159 | |

UCF Meta Data

| CE Release Version | CE ID | CE ID Check Digit | CE Live Status | CE SNED | CE Date Added | CE Date Modified | CE Genealogy | CE Sort ID | CE Language | CE License Info |
|---|---|---|---|---|---|---|---|---|---|---|
| Q3 12 - Final | 0 | 8 | 1 | S | 2009-03-11 | 2012-05-17 | 0 | 0 | eng | URL |
| Q3 12 - Final | 508 | 8 | 1 | S | 2005-12-28 | 2012-05-17 | 0 | 000 004 | eng | URL |
| Q3 12 - Final | 529 | 8 | 1 | S | 2005-12-28 | 2012-05-17 | 00000 00508 | 000 004 003 | eng | URL |
| Q3 12 - Final | 530 | 8 | 1 | S | 2005-12-28 | 2012-05-17 | 00000 00508 00529 | 000 004 003 001 | eng | URL |
| Q3 12 - Final | 531 | 2 | 1 | S | 2005-12-28 | 2012-05-17 | 00000 00508 00529 00530 | 000 004 003 001 002 | eng | URL |
| Q3 12 - Final | 533 | 1 | 1 | S | 2005-12-28 | 2012-05-17 | 00000 00508 00529 00530 | 000 004 003 001 003 | eng | URL |
| Q3 12 - Final | 532 | 0 | 1 | S | 2005-12-28 | 2012-05-17 | 00000 00508 00529 00530 00533 | 000 004 003 001 003 001 | eng | URL |
| Q3 12 - Final | 537 | 7 | 1 | S | 2005-12-28 | 2012-05-17 | 00000 00508 00529 | 000 004 003 002 | eng | URL |
| Q3 12 - Final | 548 | 6 | 1 | S | 2005-12-28 | 2012-05-17 | 00000 00508 00529 | 000 004 003 004 002 004 | eng | URL |
| Q3 12 - Final | 1281 | 7 | 1 | S | 2005-12-28 | 2012-05-17 | 00000 00805 01406 00812 00867 | 000 008 001 008 004 002 | eng | URL |
| Q3 12 - Final | 6077 | 3 | 1 | E | 2010-09-14 | 2012-08-17 | 00000 00860 00876 01517 04810 | 000 009 003 030 052 001 | eng | URL |

*FIG. 11A*

UCF Basic Info

| CE Control Title (1120) | CE Impact Zone (1105) | CE Control Classification (1106) | CE Control Type (1107) |
|---|---|---|---|
| UCF CE List | Root | IT Impact Zone | IT Impact Zone |
| Technical security | Technical security | IT Impact Zone | IT Impact Zone |
| Identify and control all network access and control points. | Technical security | Preventive | Process or Activity |
| Establish and maintain documentation to control the network configuration. | Technical security | Preventive | Establish/Maintain Documentation |
| Maintain up-to-date network diagrams. | Technical security | Preventive | Process or Activity |
| Segregate servers that contain restricted data or restricted information from direct public access. | Technical security | Preventive | Process or Activity |
| Design Demilitarized Zones with proper isolation rules. | Technical security | Preventive | Process or Activity |
| Establish and maintain a documented list of protocols, ports, applications, and services for essential operations. | Technical security | Preventive | Establish/Maintain Documentation |
| Test and approve all firewall configuration changes. | Technical security | Detective | Process or Activity |
| Verify the Configuration Management procedures are being applied to firewalls, routers, managed network switches, and hubs. | Operational management | Preventive | Process or Activity |
| Configure the Access Control List to restrict connections between untrusted networks and any system that holds restricted data or restricted information. | System hardening through configuration management | Preventive | Configuration |

*FIG. 11B*

| | 1320a |
|---|---|
| Citation Release Version | Q3 12 - Final |
| Citation ID | 32431 |
| Citation ID CheckDigit | 1 |
| Citation Live Status | 1 |
| Citation SNED | E |
| Citation Date Added | 2011-02-04 |
| Citation Date Modified | 2012-08-22 |
| Citation Deprecated By | |
| Citation Deprecation Notes | |
| Citation Parent ID | 39311 |
| Citation Sort Value | 2 |
| Citation Language | eng |
| Citation License Info | URL |
| Citation | § 1.1.1 Testing Procedures |
| Citation Guidance (1350a) | Verify that there is a formal process for testing and approval of all network connections and firewall configurations. |
| AD ID | 1071 |
| CE ID | 548 |
| Audit Item ID | 3443 |
| Asset ID | |
| cDoc ID | 30 |
| Config Item ID | |
| Mon Event ID | |
| RecCat ID | 211 |
| RecEx ID | 21   (1310a) |

*FIG. 13A*

UCF Meta Data

| Audit Item Release Version | Audit Item ID | Audit Item ID CheckDigit | Audit Item Live Status | Audit Item SNED | Audit Item Date Added | Audit Item Date Modified | Audit Item Language | Audit term License Info |
|---|---|---|---|---|---|---|---|---|
| Q3 12 - Final | 3443 | 5 | 1 | S | 2010-03-17 | 2011-09-19 | eng | URL |
| Q3 12 - Final | 3447 | 4 | 1 | S | 2010-03-17 | 2011-02-04 | eng | URL |
| Q3 12 - Final | 3448 | 8 | 1 | S | 2010-03-17 | 2011-02-04 | eng | URL |
| Q3 12 - Final | 3452 | 9 | 1 | S | 2010-03-17 | 2011-09-19 | eng | URL |
| Q3 12 - Final | 3569 | 0 | 1 | S | 2010-03-17 | 2011-09-19 | eng | URL |

*FIG. 14A*

UCF Basic Info

| Audit Item Question (1405) | Audit Item Question Method (1406) |
|---|---|
| Examine the control entitled Test and approve all firewall configuration changes [UCF CE ID 00548] in the Network Change Management policy as compared to Network Change Control Requests records Network Management and Maintenance Records record category. (1480) Does this define how the control process is being carried out? | Examine the Control in the cDoc as compared to Records in the Record_Category. Does this define how the control process is being carried out? (1450) |

UCF

| Audit term Agreed Upon Variable | cDoc ID (1451) | CE ID (1452) | RecCat ID (1453) | RecEx ID (1454) |
|---|---|---|---|---|
| | 30 | 548 | 211 | 21 |

*FIG. 14B*

| | |
|---|---|
| Citation Rel. Version | Q3 12 - Final |
| Citation ID | 32431 |
| Citation ID CheckDigit | 1 |
| Citation Live Status | 1 |
| Citation SNED | E |
| Citation Date Added | 2011-02-04 |
| Citation Date Modified | 2012-08-22 |
| Citation Parent ID | 39311 |
| Citation Sort Value | 2 |
| Citation Language | eng |
| Citation License Info | URL |
| Citation | § 1.1.1 Testing Procedures |
| Citation Guidance | Verify that there is a formal process for testing and approval of all network connections and firewall configurations. |
| AD ID | 1071 |
| CE ID | 548 |
| Audit Item ID | 3443 |
| cDoc ID | 30 |
| RecCat ID | 211 |
| RecEx ID | 21 |

| | |
|---|---|
| Audit Item Rel Version | Q3 12 - Final |
| Audit Item ID | 3443 |
| Audit Item ID CheckDigit | 5 |
| Audit Item Live Status | 1 |
| Audit Item SNED | S |
| Audit Item Date Added | 2010-03-17 |
| Audit Item Date Modified | 2011-09-19 |
| Audit Item Language | eng |
| Audit Item License Info | URL |
| Audit Item Question | Examine the control entitled Test and approve all firewall configuration changes [UCF CE ID 00548] in the Network Change Management policy as compared to Network Change Control Requests records in the Network Management and Maintenance Records record category. Does this define how the control process is being carried out? (1510) |
| Audit Item Question Method | Examine the Control in the cDoc as compared to Records in the Record_Category. Does this define how the control process is being carried out? |
| Audit Item Agreed Upon Variable | |
| UCF cDoc ID | 30 |
| CE ID | 548 |
| Metric ID | |
| RecCat ID | 211 |
| RecEx ID | 21 |
| Role ID | |

FIG. 15A

| | |
|---|---|
| CE Rel Version | Q3 12 - Final |
| CE ID | 548 |
| CE ID CheckDigit | 6 |
| CE Live Status | 1 |
| CE SNED | S |
| CE Date Added | 2005-12-28 |
| CE Date Modified | 2012-05-17 |
| CE Genealogy | 00000 00508 00529 00544 00546 |
| CE Sort ID | 000 004 003 004 002 004 |
| CE Language | eng |
| CE License Info | URL |
| CE Control Title | Test and approve all firewall configuration changes. |
| CE Impact Zone | Technical security |
| CE Control Classification | Detective |
| CE Control Type | Process or Activity |
| cDoc ID | 30 |
| RecCat ID | 211 |
| RecEx ID | 21 |

FIG. 15B

METHODS AND SYSTEMS FOR A COMPLIANCE FRAMEWORK DATABASE SCHEMA

CROSS-REFERENCE TO RELATED APPLICATION(S)

The present application is a continuation of U.S. patent application Ser. No. 17/160,175, filed on Jan. 27, 2021 and entitled "METHODS AND SYSTEMS FOR A COMPLIANCE FRAMEWORK DATABASE SCHEMA," which is a divisional of U.S. patent application Ser. No. 16/432,634, filed on Jun. 5, 2019 and entitled "METHODS AND SYSTEMS FOR A COMPLIANCE FRAMEWORK DATABASE SCHEMA," which is a continuation of U.S. patent application Ser. No. 15/794,405, filed on Oct. 26, 2017 and entitled "METHODS AND SYSTEMS FOR A COMPLIANCE FRAMEWORK DATABASE SCHEMA," which is a divisional of U.S. patent application Ser. No. 14/685,466, filed on Apr. 13, 2015 (now U.S. Pat. No. 9,996,608) and entitled "METHODS AND SYSTEMS FOR A COMPLIANCE FRAMEWORK DATABASE SCHEMA," which is a continuation of U.S. patent application Ser. No. 13/723,018, filed on Dec. 20, 2012 (now U.S. Pat. No. 9,009,197) and entitled "METHODS AND SYSTEMS FOR A COMPLIANCE FRAMEWORK DATABASE SCHEMA," which claims the benefit of U.S. Provisional Application No. 61/722,759, filed Nov. 5, 2012 and entitled "METHODS AND SYSTEMS FOR A UNIFIED COMPLIANCE FRAMEWORK DATABASE SCHEMA," all of which are incorporated herein by reference in their entireties. This application is related to U.S. patent application Ser. No. 13/952,212, filed on Jul. 26, 2013 (now U.S. Pat. No. 8,661,059) and entitled "METHODS AND SYSTEMS FOR A COMPLIANCE FRAMEWORK DATABASE SCHEMA," and U.S. patent application Ser. No. 16/026,524, filed on Jul. 3, 2018 and entitled "METHODS AND SYSTEMS FOR A COMPLIANCE FRAMEWORK DATABASE SCHEMA," both of which are incorporated herein by reference in their entireties.

BACKGROUND

Authority Documents (e.g., policies, guidelines, regulations) used for auditing organizations are written for humans. They are commonly written and presented in hierarchical format (e.g., with sections and subsections) as a set of questions intended for the human reader to navigate. Written in a hierarchical format, Authority Documents (ADs) use visual cues to instruct the reader that certain questions in the audit can be ignored. For example, if a person answers "not applicable" to question 1, then common reading skills allow the person to logically skip questions 1.1, 1.2, and so on, moving instead to question 2 in order to continue. Authority Documents are often the basis for an audit to ensure an organization's compliance.

BRIEF DESCRIPTION OF THE DRAWINGS

One or more embodiments of the present invention is illustrated by way of example and are not limited to the figures of the accompanying drawings, in which like references indicate similar elements.

FIG. 1 shows an environment of a basic and suitable computer that may employ aspects of the compliance framework.

FIG. 2 shows the various elements within the Meta Data portion of a Compliance framework table.

FIGS. 4A-4B (referred to herein as FIG. 4) show diagrams depicting features of an Authority Document and Authority Document Table.

FIGS. 5A-5C (referred to herein as FIG. 5) are examples of features associated with a Citation Table.

FIGS. 6A-6B (referred to herein as FIG. 6) are examples of features associated with a Record Examples Table.

FIGS. 7A-7B (referred to herein as FIG. 7) are examples of features associated with an Assets Table.

FIG. 8 is an example of features associated with a Configuration Items Settings Table.

FIGS. 10A-10B (referred to herein as FIG. 10) depict the mapping process shown in FIG. 9 at a record and linkage level.

FIGS. 11A-11B (referred to herein as FIG. 11) are examples of features associated with a Controls Table.

FIGS. 13A-13B (referred to herein as FIG. 13) depict the matching process shown in FIG. 12 at a record and linkage level.

FIGS. 14A-14B (referred to herein as FIG. 14) are examples of features associated with an Audit Table.

FIG. 15A-15B (referred to herein as FIG. 15) depict connecting a Citation to an Audit Question, and a Control to an Audit Question.

DETAILED DESCRIPTION

Figure 3:
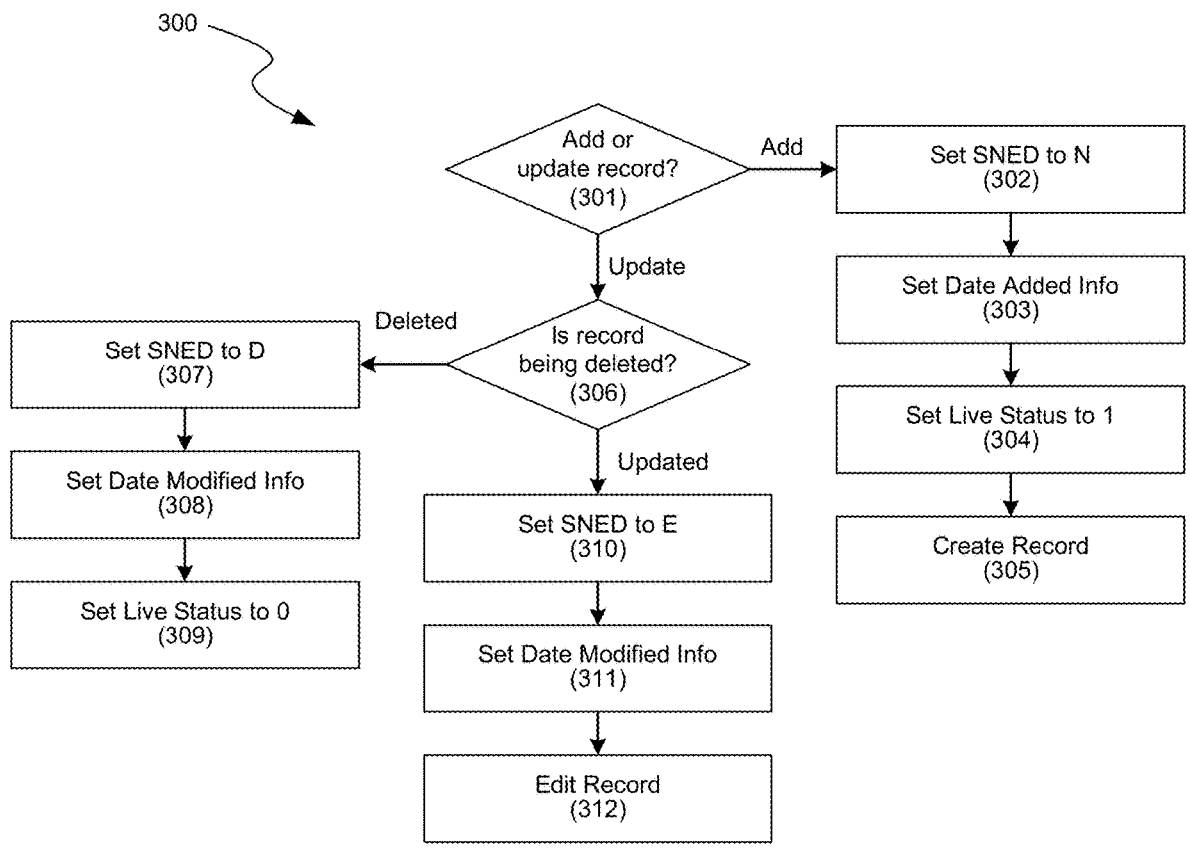
FIG. 3 shows the process for adding or editing a record and that interaction with the Meta Data.

The inventors have recognized that current technology has failed to efficiently address parsing a portion of an Authority Document to determine an audit question from its contexts or other text. For example, "Implement firewall and router configuration standards that include the following:" is text from an actual audit guide. This text isn't to be interpreted as an audit question per se. Instead, it is a prepositional placeholder for text that follows so that each following citation, when displayed, doesn't have to contain "do the firewall standards include . . . ". For purposes of asking audit questions, the prepositional placeholder can be ignored; however, for purposes of displaying it in Reports of Compliance, it cannot be ignored.

In a similar manner, instructions within an audit question regarding how to attach certain evidence to the working papers of the audit process may readily be understood by a person. For example, an instruction such as, "obtain document X and compare it to record Y—are they are the same?" can be interpreted by a person to mean: add both documents to the working papers library of this audit and compare them for their similarities; however, a computer cannot interpret what to do without further instructions.

When an edited version of an audit guide is distributed for reading, the edited version can include common editing symbols and methodologies, such as strikethrough to show deleted text (e.g., ~~deleted~~ text) and underline to show new text (e.g., <u>new</u> text). A person trained to understand these symbols may readily read and interpret changes between different versions of the same document. However, computer audit tools, such as Governance Risk and Compliance (GRC) tools, that utilize these guides must be given explicit instructions to do all of the above.

The inventors have recognized that a problem with existing technology is a lack of harmonized governance processes to support an organization's efforts in gathering evidentiary support when being audited. A compliance framework tool is described herein that allows an organization to efficiently navigate through myriad overlapping policies, guidelines, regulations, etc. to locate evidence for use in an audit, based on questions derived from a hierarchy of citations from authority documents applicable to the organization's environment.

In some embodiments, the compliance framework provides systems and methods of a unified compliance framework for generating audit-based questions based on citations that are derived from an aggregation of hierarchical formatted authority documents. For example, the compliance framework can convert hierarchical information (e.g., structured citations and their corresponding content from the authority documents) into a modular format (e.g., markup language, such as XML) for integrating into a variety of existing and emerging operating environments (e.g., various database techniques, schemas and methodologies) used by an organization.

Various embodiments of the technology are described below. The following description provides specific details for a thorough understanding and enabling description of these embodiments. One skilled in the art will understand that the compliance framework may be practiced without many of these details. Additionally, some well-known structures or functions may not be shown or described in detail, so as to avoid unnecessarily obscuring the relevant description of the various embodiments. Certain aspects of this technology relate to U.S. Provisional Application No. 61/722,759, which is incorporated herein in its entirety by reference.

The terminology used in the description presented is intended to be interpreted in its broadest reasonable manner, even though it is being used in conjunction with a detailed description of certain specific embodiments of the technology. Certain terms may even be emphasized below; however, any terminology intended to be interpreted in any restricted manner will be overtly and specifically defined as such in this Detailed Description section.

The techniques introduced below can be implemented by programmable circuitry programmed or configured by software and/or firmware, or entirely by special-purpose circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

FIG. 1 and the following discussion provide a brief, general description of a suitable computing environment in which aspects of the compliance framework can be implemented. Although not required, aspects of the technology may be described herein in the general context of computer-executable instructions, such as routines executed by a general or special-purpose data processing device (e.g., a server or client computer). Aspects of the technology described herein may be stored or distributed on tangible computer-readable media, including magnetically or optically readable computer discs, hard-wired or preprogrammed chips (e.g., EEPROM semiconductor chips), nanotechnology memory, biological memory, or other data storage media. Alternatively, computer-implemented instructions, data structures, screen displays, and other data related to the technology may be distributed over the Internet or over other networks (including wireless networks) on a propagated signal on a propagation medium (e.g., an electromagnetic wave, a sound wave) over a period of time. In some implementations, the data may be provided on any analog or digital network (packet switched, circuit switched, or other scheme).

The compliance framework can also be practiced in distributed computing environments where tasks or modules are performed by remote processing devices, which are linked through a communications network, such as a Local Area Network (LAN), Wide Area Network (WAN), or the Internet. In a distributed computing environment, program modules or sub-routines may be located in both local and remote memory storage devices. Those skilled in the relevant art will recognize that portions of the compliance framework may reside on a server computer, while corresponding portions reside on a client computer (e.g., PC, mobile computer, tablet, or smart phone). Data structures and transmission of data particular to aspects of the technology are also encompassed within the scope of the compliance framework.

Referring to FIG. 1, the compliance framework employs a computer (100), such as a personal computer, workstation, phone or tablet, having one or more processors (101) coupled to one or more user input devices (102) and data storage devices (104). The computer (100) is also coupled to at least one output device such as a display device (106) and one or more optional additional output devices (108) (e.g., printer, plotter, speakers, tactile or olfactory output devices). The computer (100) may be coupled to external computers, such as via an optional network connection (110), a wireless transceiver (112), or both. For example, network hubs, switches, routers, or other hardware network components within the network connection (110) and/or wireless transceiver (112) can couple one or more computers (100).

The input devices (102) may include a keyboard and/or a pointing device such as a mouse. Other input devices are possible, such as a microphone, joystick, pen, game pad, scanner, digital camera, video camera, and the like. The data storage devices (104) may include any type of computer-readable media that can store data accessible by the computer (100), such as magnetic hard and floppy disk drives, optical disk drives, magnetic cassettes, tape drives, flash memory cards, digital video discs (DVDs), Bernoulli cartridges, RAMs, ROMs, smart cards, etc. Indeed, any medium for storing or transmitting computer-readable instructions and data may be employed, including a connection port to or node on a network, such as a LAN, WAN, or the Internet (not shown in FIG. 1).

Compliance Framework

The compliance framework is a framework to make implementing, testing, managing and or monitoring audit questions easier and more rigorous. In one embodiment, database tables associate portions of a modular data (e.g., Meta Data, basic information, and references); however, other techniques capable of organizing referential data have been contemplated by the inventors.

Compliance Framework Meta Data

In one embodiment, the compliance framework (CF) uses a set of tables presented in a hierarchical-based markup language (e.g., XML) to facilitate ease of integration. Each row of a table organizes the table into individual records (215) that may include Meta Data, custom content, and possible references to other tables. The common Meta Data format and content of each row is used by GRC tools and other data driven applications to interpret what to do with each of the records in the table. The standard and optional elements of the Meta Data elements of each table are further described below.

FIG. 2 illustrates example Meta Data elements (201-213) of a compliance framework table (200). Each record (215) of each table (e.g., (200)) in the CF is associated with a unique and persistent identifier. For example, Citation ID column (202) has unique and persistent identifiers (e.g., "39307," "39311," 32431," etc.) for each respective record (215) in the table (200) (see also, FIG. 5). Other tables in the CF have unique and persistent identifiers associated with each record in their respective tables. The Release Version (201) is used to indicate the table's release date. To ensure that the Citation IDs (202) have integrity during input as well as distribution while being transferred into various formats (e.g., Excel, Word, Text, and or XML), in one embodiment, each Citation ID (202) is associated to a checksum value (203).

The compliance framework treats each Citation ID (202) as both unique and persistent. A Citation ID (202), in some embodiments, is maintained and or persistent within a database or other retention system. Therefore, if a record (215) must be redacted, its Live Status (204) is changed from a first value (e.g., "1") to indicate a live record (220) to a second value (e.g., "0") that indicates a withdrawn record (222). A SNED element (205) indicates an editorial status of a record (215). SNED stands for Same, New, Edited and Deprecated. To calculate a SNED element value, a checksum is created (not shown) for each record (215) based on the fields' contents in that record (215). For example, upon each new release of a record (215), values in the current release's checksum are compared to checksum values in the previous record's (215) release. If the two checksum values are the same, the result is "S" (230); if there is no previous checksum value, the result is "N" (234); if the current checksum does not match the previous, the result is "E" (232); if the current checksum's first digit is 0 and the previous release was 1, the result is "D," (236) for example. The Citation Date Added (206) element indicates the date the record (215) was added. The Citation Date Modified (207) element indicates the date the record (215) was last modified. If the record (215) is deprecated, the Deprecated By (208) element indicates the surviving record's ID (240). The Deprecation Notes (209) element indicates why (242) the record (215) was deprecated. The language used in the record (215) is indicated in (212). If a record (215) is licensed outside of the normal compliance framework licensing scheme, for example, a License Info (213) URL (or other indicator and or description) may be used to indicate a location for additional information.

For tables that must be presented in hierarchical order, as opposed to a flat document, each record (215) with a Parent ID (210) and Sort Value (211) are used to indicate a record's (215) location within the hierarchy. These two elements (210 and 211) present sufficient information for an interpreting application and or tool to create its own unique sort order for the records (215) in the table (200). Every Meta Data element (201-213) is not required to implement a compliance framework. One or more of the Meta Data elements (201-213) can be associated with the Unified Framework Table (200). This also applies to other tables in the CF.

Figure 4A:

FIG. 3 illustrates an example process (300) to add or update a record (215) in or to the compliance framework and to the associated Meta Data records, as discussed in the description for FIG. 4. An initial decision is made to add or update a record (215), in step (301), based on whether the record already exists in the UFC. In one embodiment, if the record is being added, the SNED value is assigned an N (302), the Date Added field indicates when the record (215) is added to the UFC, in (303), the Live Status (204) is set to 1 to indicate that the record (215) is current (304), and the record (215) is created, in step (305). In one embodiment, if the record (215) is being updated (i.e., not added), a decision is made to edit or delete the record, in step (306). If the record is deleted, the SNED value is set to D (307), and Date Modified (207) is added (308), and the Live Status (204) of the record (215) is set to 0 to indicate the record has been edited, in step (309). If the record (215) is updated, in some embodiments, the SNED value (204) is set to E to indicate the record (215) has been edited, in step (310), the Date Modified (207) date is updated (311), and the record (215) is edited, in step (312).

Compliance Framework Tables

A combination of one or more of the disclosed technologies allows for efficiencies in preparing, sorting, presenting and or gathering evidence for an audit. Each of the above-mentioned features of the compliance framework is further described below. One or more of the elements described in the forthcoming tables may be optionally excluded in the CF while other elements have been contemplated by the inventors and can be added to one or more of the forthcoming tables.

FIG. 4 illustrates an Authority Document Table (400). FIG. 4 depicts the Authority Document Table (400) as multiple portions, including Meta Data (400a) (e.g., having one or more elements 201-213 of Meta Data portion (200) and Basic Info (400b). The Meta Data portion (400a) and the Basic Info portion (400b) are separated into two these portions (e.g., tables), however, this is an aid for the view. The inventors contemplate that the Meta Data portion (400a) and the Basic Info Table are implemented as a single table. The Basic Info (400b) of Authority Document Table (400) contains elements (403-415) for organizing the ADs into a library (not shown) having the AD's Parent Category (403) (e.g., payment card guidance); Originator (404) (e.g., the Payment Card Industry); Type (405) (e.g., a contractual obligation); and Title Type (406) (e.g., Authority Document (AD) (i.e. a document with controls), or Glossary (GL) (i.e. an AD without controls). Controls are explained in more detail below. The Universal Resource Locator (URL) (407) denotes where the Authority Document was found (e.g., at a website), however, other indicators and or descriptions can be used.

Naming information (412) of an Authority Document may include a Common Name (408) (i.e., what the AD is commonly referred as); Published Name (409); and Version (410), which together form the Official Name (411).

The Authority Document's Availability (413) Effective Date (414) and a calculated description (415) are optionally included in the Authority Document Table (400) to denote additional information.

FIG. 5 shows one example of a Citation Table (500) that is capable of implementing features of the compliance framework. The Citation Table (500), in some embodiments, has three parts; Meta Data (500a); Basic Info (500b); and associated References (500c). Meta Data (500a) is similar to Meta Data (200), therefore, to simplify the description for FIG. 5, a detailed description of Meta Data (500a) is not included as part of the description for FIG. 5.

The Basic Info (500b) of a citation may contain Citation Reference (503) and a Citation Guidance (504). In one embodiment, a Citation Reference (503) represents a section (e.g., § 1.1.1) of an AD. Citation Guidance elements (504) represents the content associated with the Citation Reference (503). In some embodiments, the Citation Guidance (504) is examined, by the CF, for their verbs and nouns. The nouns within each row of the Citation Guidance (504) are used to reference potential evidence for the compliance framework. For example, Citation ID 32431 (550a) refers to Citation Guidance entry (550b) which states, "Verify that there is a formal process for testing and approval of all network connections and firewall configurations. "The noun "router configurations" is identified and linked to a specific Record Example (e.g., "21") (550c) and Asset ID "669" (580). Record Examples are explained in more detail in reference to FIG. 6. In another instance, the Citation ID "32436" (570a) refers to Citation Guidance (570b) "Verify that firewall configuration standards include requirements for a firewall at each Internet connection and between any DMZ and the internal network zone. "The noun "firewall configuration standard" is identified and can be linked to a specific Compliance Document (e.g., "106") (570c) and the noun "firewall" may be identified and linked to a specific Asset (e.g., "1524") (570d).

In some embodiments a single citation contains more than one noun. For example, Citation ID 32431 (i.e., "§ 1.1.1 Testing Procedures") describes both "router configurations" (mentioned above) and, additionally, "firewall configurations." The noun "router configurations" is identified and linked to Record Example (e.g., "21") (550c) and to Asset ID "669" (580a), for example, and the noun "firewall configurations" is linked to the same Record Example (e.g., "21") (550c) but a different Asset (e.g., "1524") (580b), which is the same Asset "1524" associated with the "firewall" noun in Citation ID "32436" (570a).

Nouns, in some embodiments, are maintained in external tables suited to define each type of noun. Example noun tables include Assets, Configuration Items, Roles, Events, Metrics, Organizational Functions, Organizational Tasks, Record Category, Record Examples, Data Field, and cDocs, among others.

Figure 6B:

FIG. 6 illustrates an example Record Examples Table (600) that contains information specific to nouns that are records. FIG. 6 depicts the Record Examples table (600) into a Meta Data portion (600a) and Basic Info portion (600b).

The Meta Data portion (600a) is explained in more detail in FIG. 2 and in other tables, therefore, for simplification its features are not described in detail in FIG. 6. The Basic Info portion (600b) for a record example may include, among other things, the Record Example Name (605), Record Example Retention Years (608) (e.g., "hold for 5 years," etc.); Record Example Description (606); and a Record Example Retention Event (607) (e.g., "after the contract is closed," "when the case opens," etc.). In other embodiments, one or more of 605-608 are optional.

FIG. 7 illustrates an Asset Table (700) that contains information specific to nouns that are assets (e.g., routers, firewalls, etc.). FIG. 7 depicts the Asset table (700) as having a Meta Data portion (700a) and Basic Info portion (700b). The Basic Info (700b) of an asset may include, in some embodiments, the Asset's Category (703) (e.g., networks, applications, hardware, facilities, etc.); Asset Class (704); (e.g., a subcategory of Asset category (703); Asset Type (705); Asset Name (706); Asset Common Name (707); Asset Version (708); Asset Platform (709) (e.g., 32 bit processor, 63 bit processor, INTEL, AMD, etc.); and Asset Update information (710) (e.g., the update's version information, such as "Revision 42a, patch 15B, etc.).

FIG. 8 illustrates the Configuration Items Settings Table (800) that contains information specific to nouns that are configurations settings (e.g., "deny all traffic if 'X' occurs").

FIG. 8 depicts the Configuration Items Setting Table (800) as having a Meta Data portion (800a) and Basic Info portion (800b). The Basic Info portion (800b) contains information specific to nouns that define a Configuration Item (804) (e.g., "Rules Configuration settings") and its Settings (805) (e.g., "deny all traffic unless explicitly allowed").

Figure 9:
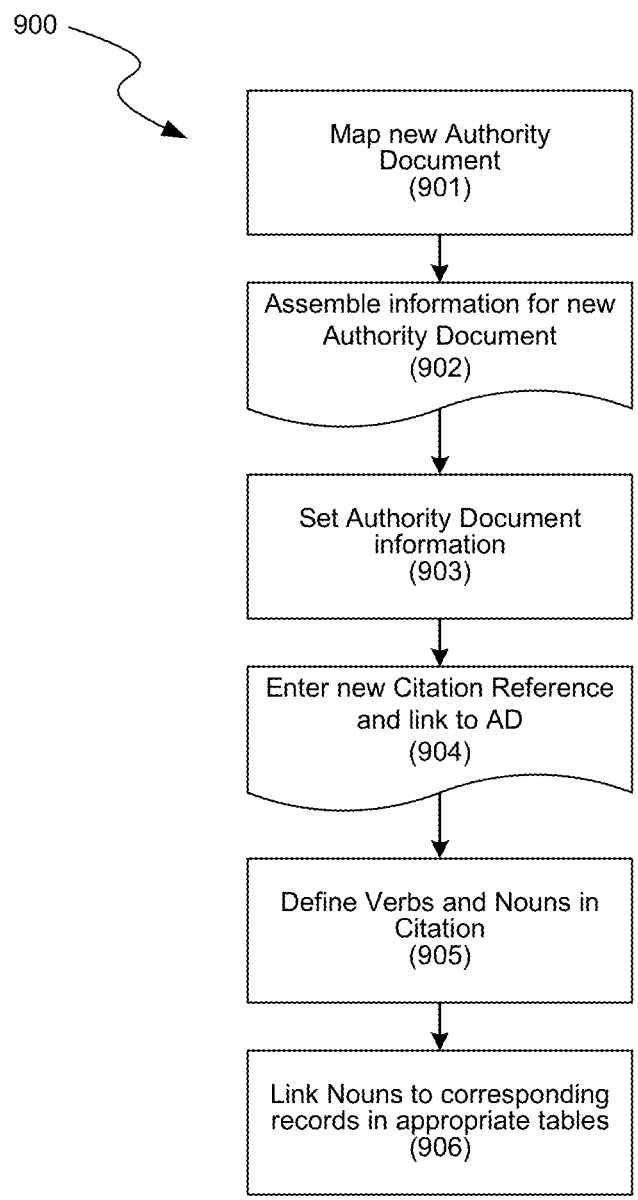
FIG. 9 is a simple workflow for mapping an Authority Document and associated Citations.

FIG. 9 is a flowchart (900) showing how the CF adds a citation from an Authority Document and then links the nouns in the record to citation's Citation Guidance (504), as discussed above. When a new Authority Document is added to the compliance framework, its relevant information (e.g. one or more elements 403-415 of FIG. 4, for example) is assembled into the Authority Document's record, in step (902), and added to a, optional, database, in step (903). In some embodiments, once an AD ID (202) for a new Authority Document is identified, one or more new citation references can be added and linked to the AD's ID (202), in step (904). For example, as previously discussed, verbs and nouns can be defined within a citation (905) and linked to their corresponding records in appropriate tables, as processed in step (906). Citation Guidance (504) may contain one or more nouns. When a citation has more than a signal noun, each noun can be treated separate from other nouns in the citation (i.e. each noun is linked to a corresponding record in an appropriate table (906)), as further described in the description for FIG. 10.

Figure 10B:
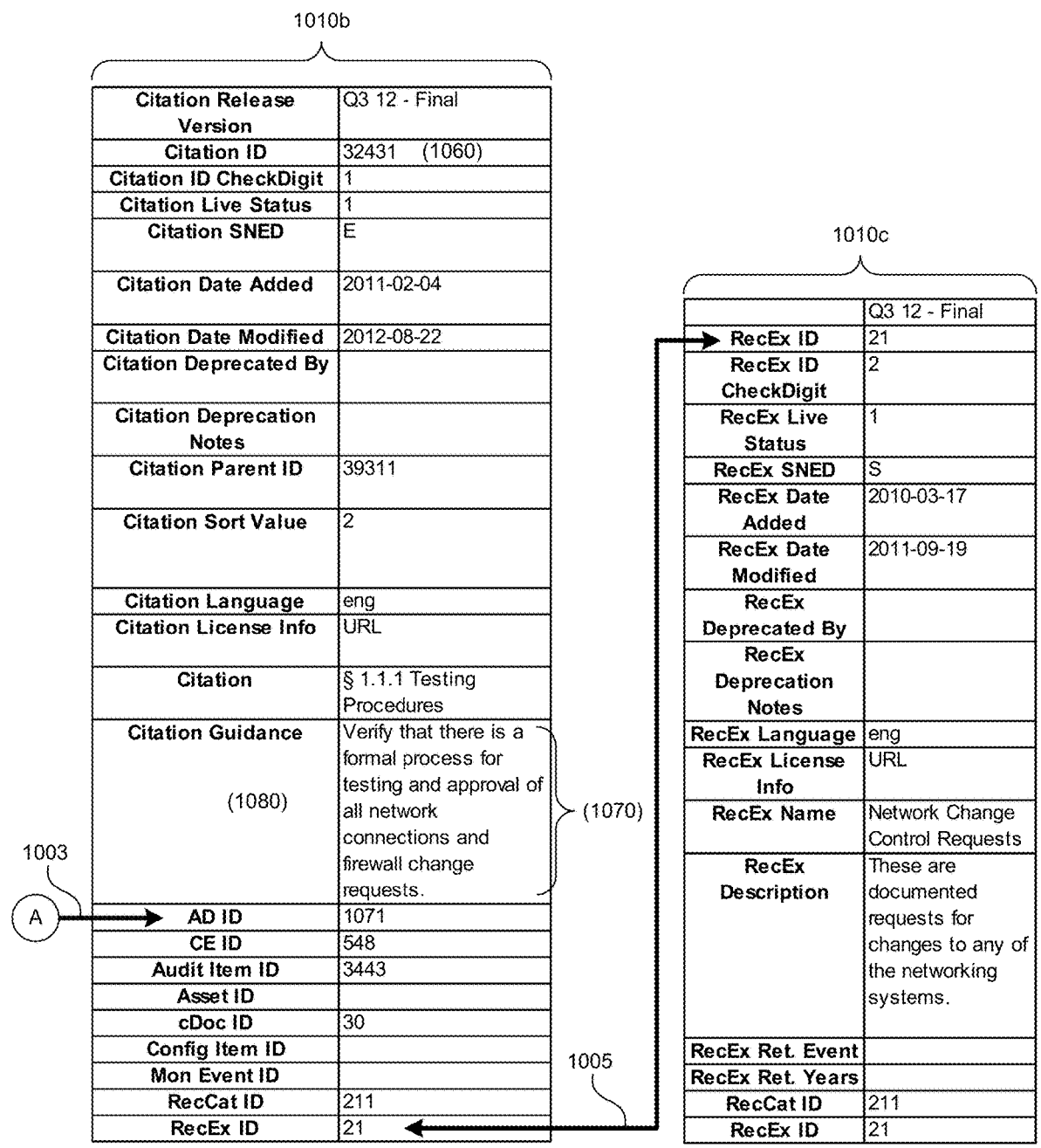

FIG. 10 depicts the process of FIG. 9 at a record level. An Authority Document record, (e.g., having AD ID of 1071 (1050), has record information (1010a) associated with its corresponding Meta Data (450a), and Basic Info (450b) and any references and or additional information (not shown). A new Citation, having Citation ID '32431' (1060), for example, is created with its corresponding information (1010b), such as its Meta Data (500a) and Basic Info (500b). A reference (1003) between the new Citation, (i.e., Citation ID '32431' (1060)) and the existing Authority Document (i.e., AD ID 1071 (1050)) is linked together (1003) (i.e., a logical connection is made). In some embodiments, once the citation is created, its nouns are examined and associated (linked) to Record Example Tables (600). For example, the noun "network connections" (1070) found within Citation Guidance "Verify that there is a formal process for testing and approval of all network connections and firewall change requests" (1080), is linked (1005) to the Record Example Name "Network Change Control Requests" (1082) of Record Example (1010c) to form a connection between the two records (1010b) and (1010c). In some embodiments, more than one noun is in a single citation. For example, in the above example "network connections" and "firewall change control requests" are each present in the Citation Guidance (1080). In this scenario, "network connections" is linked as described above. In addition, "firewall change request," in some embodiments, is separately linked to the same or other Record Example Table(s) (600).

A process similar to the process of FIGS. 9-10 is also applicable to nouns of other assets. For example, the process described in FIG. 9 can be used for Configuration Items, Roles, Events, Metrics, Organizational Functions, organizational tasks, record category, record example, data field, and cDocs.

FIG. 11 depicts example features of a Controls Table (1100). Table 1100 has at least Meta Data Information (1100a) and Basic Information (1100b). Controls are harmonized, or de-duplicated noun/verb pairs that originate from citations. The Basic Info (1100b) for Controls are the Control Title (i.e., a harmonized, or de-duplicated noun/verb pairs that originate from Citations) (1120); an Impact Zone categorization (i.e., the category affected by the harmonized control) of the Control (1105); the Classification for the Control (1106); and a Control's action Type (1107).

Figure 12:
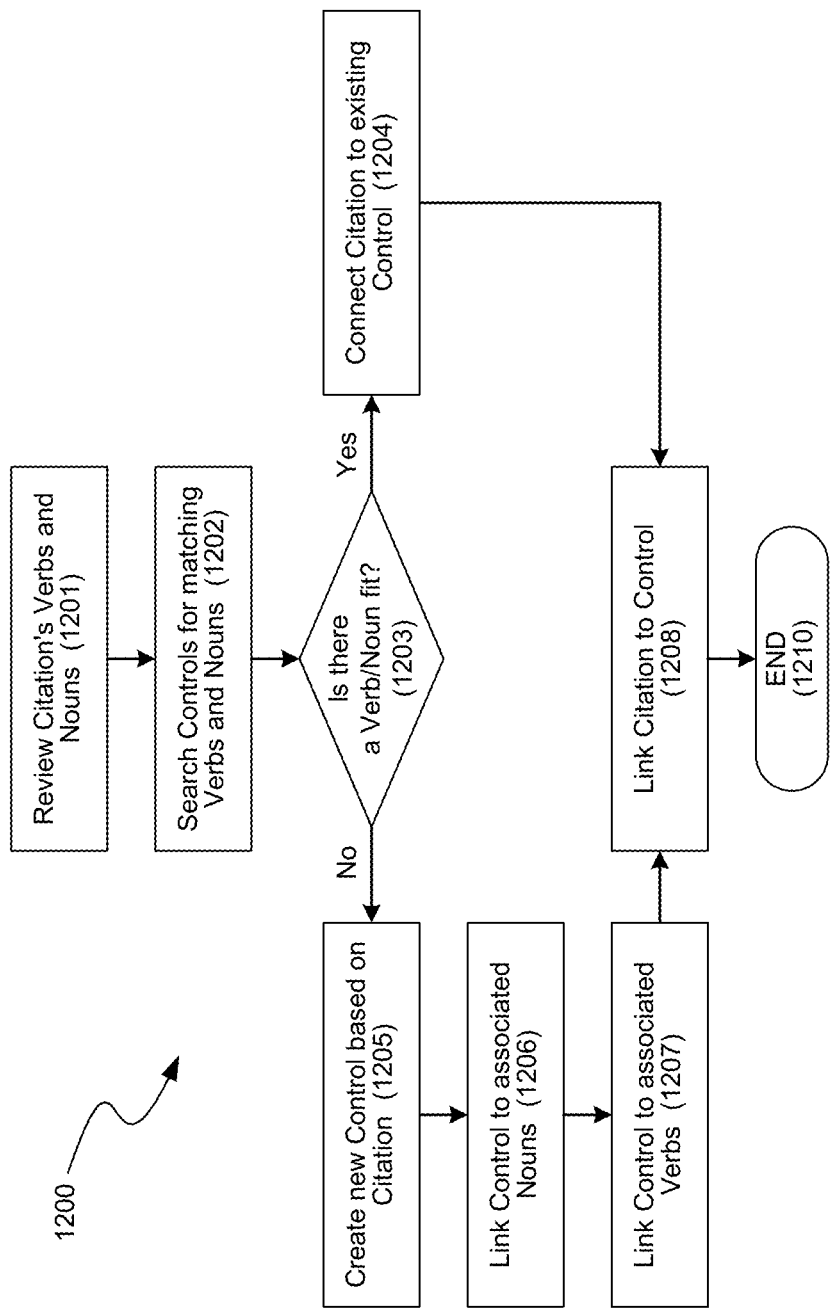
FIG. 12 is a simple workflow for matching a Citation to a Control through its verbs and nouns.

FIG. 12 is a flowchart (1200) showing how the CF maps citations to existing Controls, or creates new Controls if a citation is not matched. Initially, a citation's verbs and nouns are reviewed (1201) and then searched for in one or more Controls, in step (1202). If there is a Verb/Noun match (1203), the process flows to connect the Citation to a Control (1204). This noun matching is shown at the record level in FIG. 13.

Figure 13B:
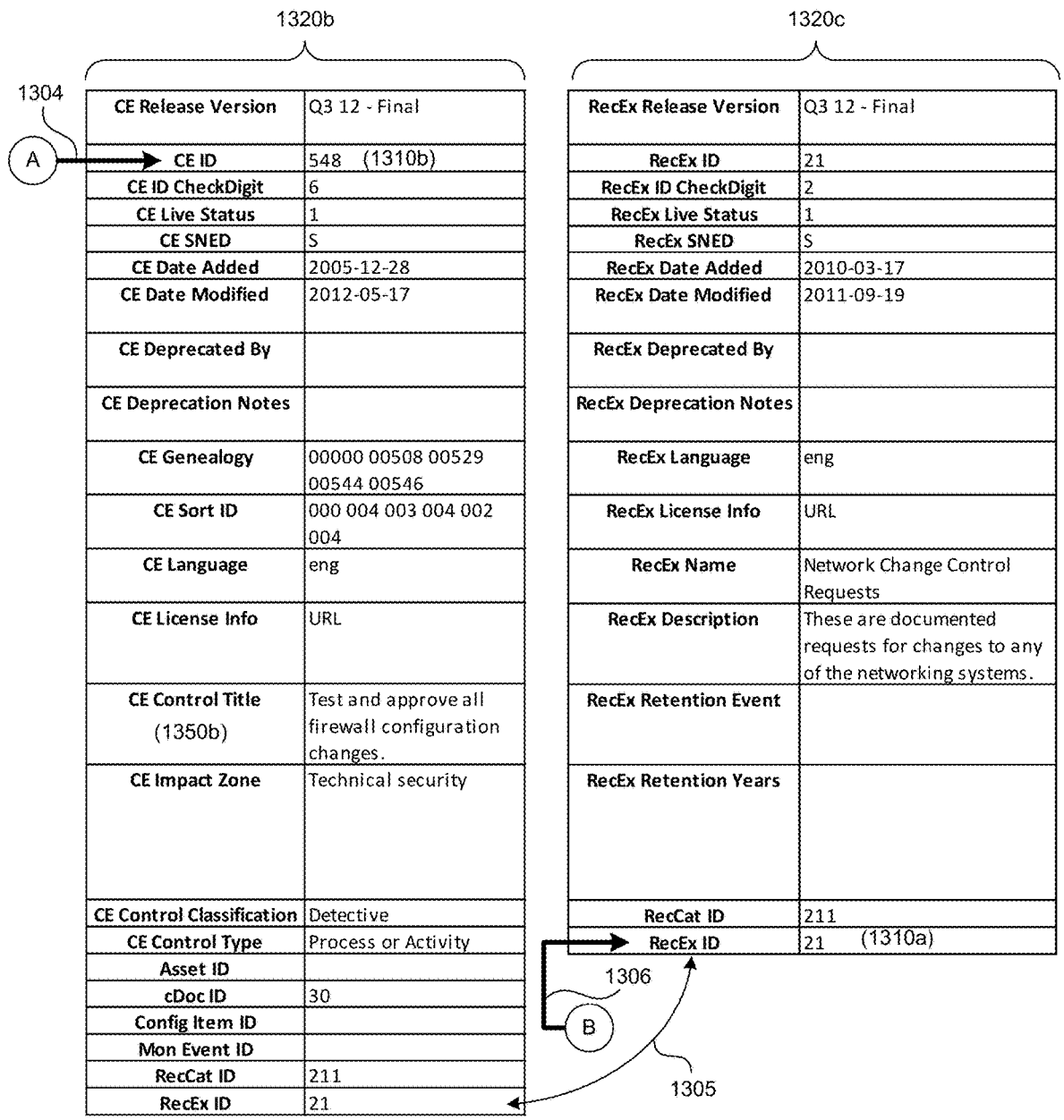

In FIG. 13, Citation Guidance, "Verify that there is a formal process for testing and approval of all Network connections and change requests to firewall and router configurations," (1350*a*) of citation record (1320*a*), is linked (1304) to Control record (1320*b*) based on at least one citation record (1320*a*) having the same Record Example ID 21 (1310*a-b*). Control record (1320*b*) having Control Title, "Test and Approve all firewall configuration Changes," (1350*b*) is linked (1305) to the same noun/Record Example (1320*c*) based on their shared value for Record Example Id (i.e., 21). In some embodiments, a bridged connection (1304) links the Citation Record (1320*a*) and the Control Record (1320*b*), which corresponds to step (1208) of FIG. 12.

Returning to FIG. 12, in some embodiments, had there not been a Verb/Noun bridge between the citation (1320*a*) and the Control (1320*c*), the flow would have proceeded to step (1205). In this scenario, a new Control can be created, at step (1205), based upon the language found in the Citation. The Control's nouns and verbs can be linked, at step (1206) and (1207), to their respective tables The process ends at step (1210).

Auditing Compliance

In order to test an organization's compliance to the various Authority Documents and their Citations, the compliance framework, in some embodiments, synthesizes one or more Citation Statement into an Audit Question. Within the compliance framework Audit Questions follow the same Meta Data (e.g. 200), Basic Info (e.g. 450*b*), and references (e.g. 500*c*) format as the other previously described tables.

FIG. 14 depicts one example of an Audit Table (1400) that is capable of implementing features of the compliance framework. FIG. 14 illustrates the Audit Table depicted as three main parts: Meta Data (1400*a*), Basic Info (1400*b*) and associated References (1400*c*).

Audit Questions are a pairing of evidence and examination methods. The compliance framework creates an Audit Question (1405) based upon one or more of, a linguistic calculation of an examination method (1406), evidence associated with the Audit Question (e.g. information in References 1400*c*), and any agreed upon variables to the question (1407). An example of an Audit Question Method (1405) is "Examine the Control in the cDoc as compared to Records in the Record Category. Does this define how the control process is being carried out?" (1450), paired with a cDoc ID 30 (1451), a Control ID 548 (1452), a Record Category ID 211 (1453), and a Record Example ID 21 (1454). The compliance framework's methodology can identify the text from the relevant IDs (1451-1454) and replace placeholder terms (e.g. Control, cDoc, Records, and Record Category) with the text matching each relevant ID. The resultant Audit Item Question (1405) can be "Examine the control entitled Test and approve all firewall configuration changes [CF CE ID 00548] in the Network Change Management policy as compared to Network Change Control Requests records in the Network Management and Maintenance Records record category. Does this define how the control process is being carried out?" (1480).

FIG. 15 is a depiction of linking a Citation Record (1501) and a Control Record (1504) to an Audit Question (1510) of an Audit Record (1502). A Citation Record (1501) is linked (1503) to an Audit Question (1510) based on each record sharing the same Audit Item ID (e.g., 3443). Each Control Record (1504) is linked (1505) to that Audit Question (1510), based on each sharing the same Control Example ID (e.g. 548). Linking allows different Citations (1501) from different Authority Documents that map to the same Control (1504) to use the same Audit Question (1510) if the evidential nouns match, for example.

Figure 16:
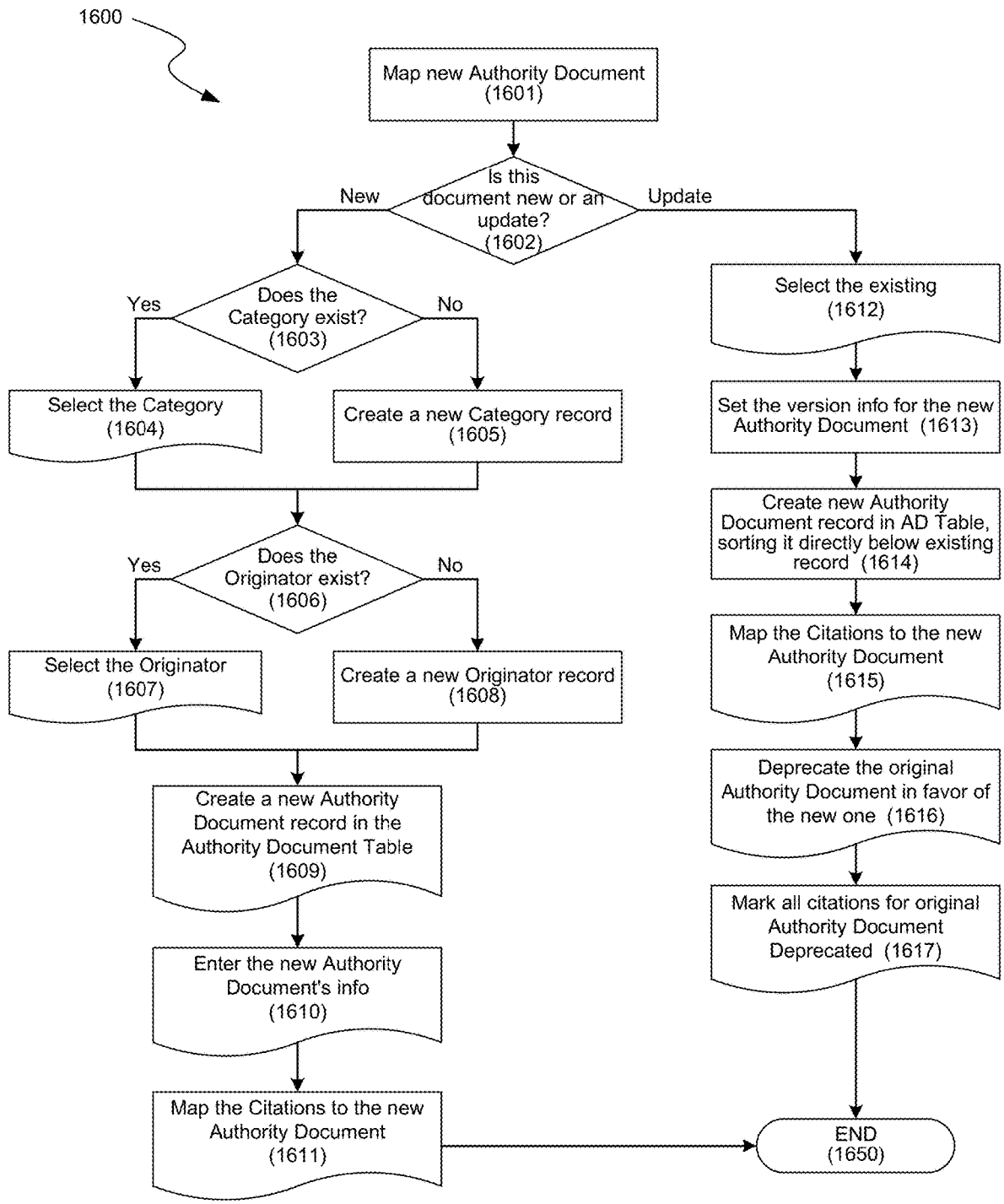
FIG. 16 is a flowchart of a simple process used to map a new or existing Authority Document's citation.

FIG. 16 is a flowchart (1600) showing how the CF is used to map a new or existing Authority Document's Citation(s). Once a new Authority Document is mapped, in step (1601), the compliance framework can determine whether the Authority Document is new or an update to an existing Authority Document, in step (1602). If the Authority Document is new to the compliance framework, the Authority Document can be reviewed for its applicable categories (e.g., Payment Guidance; AIPLA; Government Compliancy Statue) (1603). If the category exists in the Authority Document Table, that category is selected (1604). Following this, a new category record is created and selected (1605). If the originator of the Authority Document exists (1606), that originator is selected (1607), otherwise a new originator record is created and selected (1608). At step 1609, a new Authority Document record can be created in the Authority Document Table (1616) and, based at least on some of the selected information, a new Authority Document is created (1610). Citations are then mapped to the new Authority Document (1611) and the process ends at step 1650.

If, during step 1602, it is determined that the Authority Document is an update to an existing Authority Document, the existing Authority Document is selected, step (1612), and its version information is updated to indicate a new version (1613). A new record for the new Authority Document is created in the Authority Document Table, and optionally sorted relative to the placement of the preview version of the Authority Document (1614). At step 1615, citations are mapped to the new Authority Document. Step 1616, indicates that the previous (e.g., the original) Authority Document is deprecated based on the updated Authority Document. In some embodiments, all of the citations associated with the previous version of the Authority Document are marked for deprecations (1617). The process ends at step 1650.

The compliance framework describes a unified compliance framework for facilitating an organization's compliance with multiple authority documents by providing efficient methodologies and refinements to existing technologies, such as providing hierarchical fidelity to the original Authority Document; separating auditable citations from their context (e.g., prepositions and or informational citations); asset focused citations; and SNED and Live values, among others.

In general, the detailed description of embodiments of the compliance framework is not intended to be exhaustive or to limit the technology to the precise form disclosed above. While specific embodiments of, and examples for, the technology are described above for illustrative purposes, various equivalent modifications are possible within the scope of the compliance framework, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the compliance framework provided herein can be applied to other systems, not necessarily the system described herein. The elements and acts of the various embodiments described herein can be combined to provide further embodiments.

These and other changes can be made to the compliance framework in light of the above Detailed Description. While the above description details certain embodiments of the technology and describes the best mode contemplated, no matter how detailed the above appears in text, the compliance framework can be practiced in many ways. The compliance framework may vary considerably in its implementation details, while still being encompassed by the technology disclosed herein. As noted above, particular terminology used when describing certain features or aspects of the compliance framework should not be taken to imply that the terminology is being redefined herein to be restricted to any specific characteristics, features, or aspects of the technology with which that terminology is associated. In general, the terms used in the following claims should not be construed to limit the compliance framework to the specific embodiments disclosed in the specification, unless the above Detailed Description section explicitly defines such terms. Accordingly, the actual scope of the compliance framework encompasses not only the disclosed embodiments, but also all equivalent ways of practicing or implementing the compliance framework.

I claim:

1. A memory storing a data structure accessible by one or more processors of a data processing system that performs database operations based, at least in part, on the data structure, the data structure comprising:
   a record for a citation among multiple citations within multiple authority documents, each record comprising:
      an editorial status of the record, wherein the editorial status is calculated, by the one or more processors, based on a comparison between a first checksum value of fields in a current release of the record and a second checksum value of fields in a previous release of the record, to indicate a status selected from a set including a same status, a new status, an edited status, and a deprecated status, and wherein:
         if the first checksum value equals the second checksum value, the status is selected to be the same status,
         if the second checksum value does not exist, the status is selected to be the new status,
         if the first checksum value does not match the second checksum value, the status is selected to be the edited status, and
         if a predefined digit of the first checksum value differs from a predefined digit of the second checksum value in a predefined manner, the status is selected to be the deprecated status; and
      an indication of a control connected to the citation based on calculation using the one or more processors.

2. The memory of claim 1, wherein the predefined digit of the first checksum is the first digit of the first checksum and the predefined digit of the second checksum is the first digit of the second checksum.

3. The memory of claim 1, wherein if the status is selected to be the deprecated status, the record includes a deprecated-by field with a value identifying a surviving record.

4. The memory of claim 1, wherein the record further comprises information identifying the record in a hierarchy in accordance with the multiple of citations.

5. The memory of claim 4, wherein the information includes a parent record identifier and a sort value.

6. The memory of claim 5, wherein the parent record identifier indicates the citation's position in the hierarchy relative to at least an ancestor citation in the hierarchy.

7. The memory of claim 5, wherein the sort value indicates the citation's position in the hierarchy relative to a set of siblings in the hierarchy.

8. The memory of claim 1, wherein the control connected to the citation is generated based on a noun-verb pair for the citation.

9. One or more instances of non-transitory computer-readable media collectively storing a data structure accessible by one or more processors of a computing system that performs database operations based, at least in part, on the data structure, the data structure comprising:
   a record for a citation among multiple citations within multiple authority documents, each record comprising:
      an editorial status of the record, wherein the editorial status is calculated, by the one or more processors, based on a comparison between a first checksum value of fields in a current release of the record and a second checksum value of fields in a previous release of the record, to indicate a status selected from a set including a same status, a new status, an edited status, and a deprecated status, and wherein:
         if the first checksum value equals the second checksum value, the status is selected to be the same status,
         if the second checksum value does not exist, the status is selected to be the new status,
         if the first checksum value does not match the second checksum value, the status is selected to be the edited status, and
         if a predefined digit of the first checksum value differs from a predefined digit of the second checksum value in a predefined manner, the status is selected to be the deprecated status; and
      an indication of a control connected to the citation based on calculation using the one or more processors.

10. The one or more instances of non-transitory computer-readable media of claim 9, wherein the predefined digit of the first checksum is the first digit of the first checksum and the predefined digit of the second checksum is the first digit of the second checksum.

11. The one or more instances of non-transitory computer-readable media of claim 9, wherein if the status is selected to be the deprecated status, the record includes a deprecated-by field with a value identifying a surviving record.

12. The one or more instances of non-transitory computer-readable media of claim 9, wherein the record further comprises information identifying the record in a hierarchy in accordance with the multiple of citations.

13. The one or more instances of non-transitory computer-readable media of claim 12, wherein the information includes a parent record identifier and a sort value.

14. The one or more instances of non-transitory computer-readable media of claim 13, wherein the parent record identifier indicates the citation's position in the hierarchy relative to at least an ancestor citation in the hierarchy.

15. The one or more instances of non-transitory computer-readable media of claim 13, wherein the sort value indicates the citation's position in the hierarchy relative to a set of siblings in the hierarchy.

16. The one or more instances of non-transitory computer-readable media of claim 9, wherein the control connected to the citation is generated based on a noun-verb pair for the citation.

17. A system comprising memory that stores content accessible by one or more processors to perform database operations, the content comprising:
   a record for a citation among multiple citations within multiple authority documents, each record comprising:
      an editorial status of the record, wherein the editorial status is calculated, by the one or more processors, based on a comparison between a first checksum value of fields in a current release of the record and a second checksum value of fields in a previous release of the record, to indicate a status selected from a set including a same status, a new status, an edited status, and a deprecated status, and wherein:
         if the first checksum value equals the second checksum value, the status is selected to be the same status,
         if the second checksum value does not exist, the status is selected to be the new status,
         if the first checksum value does not match the second checksum value, the status is selected to be the edited status, and
         if a predefined digit of the first checksum value differs from a predefined digit of the second checksum value in a predefined manner, the status is selected to be the deprecated status; and
      an indication of a control connected to the citation based on calculation using the one or more processors.

18. The system of claim 17, wherein the predefined digit of the first checksum is the first digit of the first checksum and the predefined digit of the second checksum is the first digit of the second checksum.

19. The system of claim 17, wherein if the status is selected to be the deprecated status, the record includes a deprecated-by field with a value identifying a surviving record.

20. The system of claim 17, wherein the record further comprises information identifying the record in a hierarchy in accordance with the multiple of citations.

21. The system of claim 20, wherein the information includes a parent record identifier and a sort value.

22. The system of claim 21, wherein the parent record identifier indicates the citation's position in the hierarchy relative to at least an ancestor citation in the hierarchy.

23. The system of claim 21, wherein the sort value indicates the citation's position in the hierarchy relative to a set of siblings in the hierarchy.

24. The system of claim 17, wherein the control connected to the citation is generated based on a noun-verb pair for the citation.

* * * * *